United States Patent [19]

Harris

[11] Patent Number: 4,849,967
[45] Date of Patent: Jul. 18, 1989

[54] MULTIPLEX CONTROL SYSTEM

[75] Inventor: Paul A. Harris, Witney, England

[73] Assignee: Lucas Industries public limited company, Birmingham, United Kingdom

[21] Appl. No.: 162,973

[22] Filed: Mar. 2, 1988

[30] Foreign Application Priority Data

Mar. 4, 1987 [GB] United Kingdom ............... 8705022

[51] Int. Cl.4 .............................................. H04J 3/02
[52] U.S. Cl. ........................................ 370/85; 370/96
[58] Field of Search ................ 370/85, 86, 88, 112, 370/90, 96; 340/825.5, 52 F, 825.08; 307/10 R

[56] References Cited

U.S. PATENT DOCUMENTS

| 3,814,861 | 6/1974 | Robbins | 370/85 |
| 4,149,144 | 4/1979 | Diefenderfer | 370/96 |
| 4,679,192 | 7/1987 | Vandrabant | 370/96 |
| 4,736,367 | 4/1988 | Wroblewski et al. | 370/85 |

FOREIGN PATENT DOCUMENTS 1427133 11/1971 United Kingdom .
1414574 2/1973 United Kingdom .
1539805 4/1976 United Kingdom .

Primary Examiner—Douglas W. Olms
Assistant Examiner—Frank M. Scutch, III
Attorney, Agent, or Firm—Nixon & Vanderhye

[57] ABSTRACT

A multiplex control system e.g. for the facia of a vehicle comprises a control unit and a plurality of input elements e.g. control switches connected to a wiring bus, the control unit transmitting a pulse train along the bus and each input element including a circuit which counts the pulses in the train and modifies the jth pulse (where j is a count unique to that particular input element) if that input element is in a predetermined condition (e.g. the control switch is operated). The control unit is arranged to detect any such pulse modification to identify the corresponding input element and e.g. operate a load device accordingly.

12 Claims, 3 Drawing Sheets

MULTIPLEX CONTROL SYSTEM

BACKGROUND OF THE INVENTION

1. Field of the Invention

This invention relates to a multiplex control system particularly but not solely for the facia or dashboard area of a motor vehicle.

2. Discussion of Prior Art

Conventionally in the facia or dashboard area of a motor vehicle, there are a very large number of wires some of which interconnect control switches with load devices situated elsewhere and others of which interconnect sensors with instruments provided on the facia. This requires the production of complicated wiring harnesses and problems arise through the limited space available behind the facia. Various multiplex control systems have been proposed in order to try and overcome these problems but have all suffered from various disadvantages.

SUMMARY OF THE INVENTION

We have now devised an improved multiplex control system particularly but not solely for the facia or dashboard area of a motor vehicle.

In accordance with this invention, there is provided a multiplex control system comprising a wiring bus, a control unit connected to the bus, and a plurality of input elements connected or connectable to the bus in parallel, the control unit being arranged to transmit a pulse train along the bus and each input element including a circuit arranged to count the pulses and modify the jth pulse (where j is a count unique to that particular input element) if that input element is in a predetermined condition, and the control unit being further arranged to detect any such pulse modification and identify the corresponding input element.

The wiring bus may comprise a flexible printed circuit for attachment to the reverse of the facia moulding of a vehicle. The input elements may comprise control switches which may be inserted through apertures in the facia moulding and plug into this flexible circuit. The bus may extend across the facia between two control units mounted on the bulkhead adjacent the opposite sides of the vehicle, the two control units being connected to the opposite ends of the bus. The two control units may then control load devices situated on their respective sides of the vehicle in response to operation of the control switches, without the need for any wiring harnesses to cross from one side of the vehicle to the other. The two control units preferably transmit trains of pulses alternately.

Conveniently each control switch or other element may modify the transmitted pulse (at the predetermined pulse count for that switch and if the switch is operated) by connecting the signal wire to ground through a local resistor and thereby reduce the amplitude of that pulse. This amplitude reduction is readily detected by the control unit(s) and the particular switch identified.

In a simple form, the bus may comprise three wires, namely supply, ground and signal. However, each control switch may be provided with a local indicator light (to show when the switch is in its operated condition). In this case, the bus may include a fourth wire for carrying a pulse to turn on the local indicator light of the operated control switch. This fourth wire may also be used for resetting the counters of the control switches at the end of a train of pulses transmitted from each control unit over the signal wire: thus the control switches may respond to a pulse on the fourth wire co-incident with a pulse on the signal wire in order to energise the local indicator light, and respond to a pulse on the fourth wire non-coincident with a pulse on the signal wire in order to reset the counter.

The control system may also be used for transmitting serial data to an instrumentations package disposed behind the facia and controlling instruments mounted on the facia. Thus, a block of say 190 serial data bits may be transmitted to the instrumentations package over the signal line of the bus, between successive trains of the signal pulses for the switches.

Apart from application to the vehicle facia, the control system may be used in other areas of a vehicle. For example, it may be used in the doors, monitoring for switch operations and controlling local loads, e.g. door window lift relays.

BRIEF DESCRIPTION OF THE DRAWINGS

Embodiments of this invention will now be described by way of example only and with reference to the accompanying drawings, in which.

DETAILED DESCRIPTION OF PREFERRED EMBODIMENTS

Figure 1:
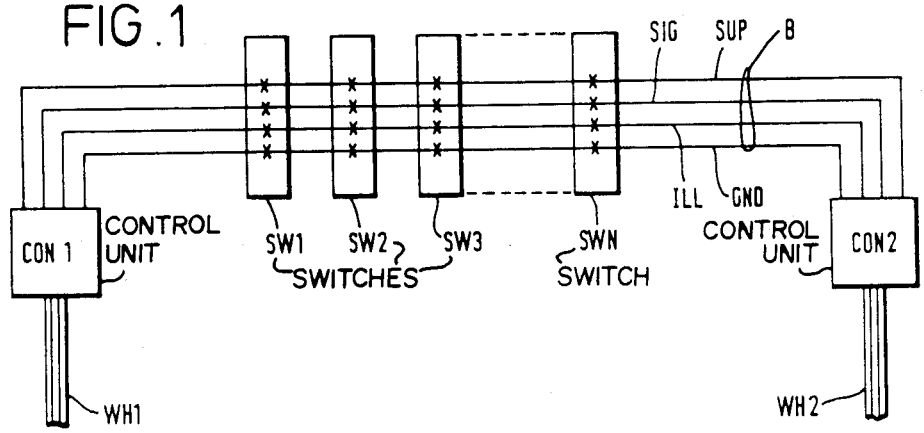
FIG. 1 is a diagram of a multiplex control system in accordance with this invention.

Referring to FIG. 1, there is shown a multiplex control system for a vehicle facia. In this system, a four-wire bus B is provided in the form of a flexible printed circuit board for attachment to the reverse of the facia moulding of a vehicle. The bus may be installed to extend across the facia between two control units CON 1 and CON 2, which may be mounted on the vehicle bulkhead adjacent the opposite sides of the vehicle. The two control units control load devices situated on their respective sides of the vehicle via wiring harnesses WH1 and WH2 and either in multiplexed or parallel mode. Control switches SW1 . . . ) SWN are mounted to the facia and plug into the bus B to interconnect with its four wires, being a supply line SUP, a ground line GND, a signal line SIG and a fourth or illumination line ILL.

Figure 2:
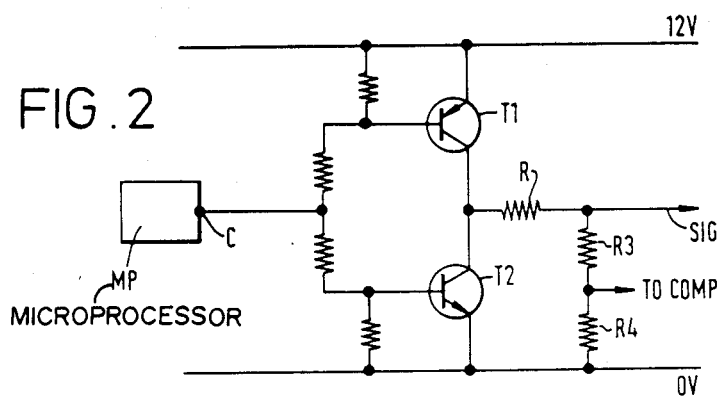
FIG. 2 is a diagram of a pulse transmitting circuit of a control unit of the system.

Referring to FIG. 2, each of the control units CON 1 and CON 2 is arranged to transmit a train of pulses over the signal line SIG. Each control unit is microprocessor-controlled and the microprocessor MP supplies a signal at C to the bases of a pair of transistors T1 and T2 which are connected between a 12 volt supply rail and a ground rail. When the signal at C is low, transistor T1 is conductive and transistor 2 non-conductive so that a 12 volt pulse is applied to the signal line SIG via a series resistor R. Otherwise, the signal at C is high so that transistor T1 is non-conductive and transistor T2 is conductive and the signal line SIG is at 0 volts. Each control unit, in the example shown, is arranged to transmit a train of 64 pulses and then stops: meanwhile the other control unit counts the pulses transmitted to it over the signal line SIG, and after counting 64 pulses it commences to transmit its own train of 64 pulses. The two control units continue unit is arranged to transmit another train of 64 pulses if it receives no pulses from the other control unit within a predetermined time after completing each train: in effect, if one control unit fails then the other takes over. At power up, one control unit waits for the other to transmit its train of pulses but will take over if it receives no pulses within a predetermined time.

Figure 3:
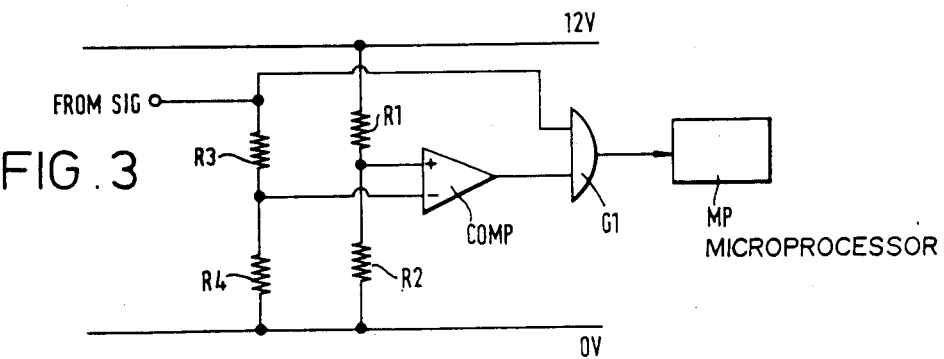
FIG. 3 is a diagram of a detecting circuit of the control unit.

Referring to FIG. 3, each of the control units CON 1 and CON 2 includes a circuit for detecting if any of the pulses transmitted over the signal line SIG is modified (specifically by a half-reduction in level) by any of the control siwtches, as will be described with reference to FIG. 4. The detecting circuit in each control unit comprises a comparator stage COMP having a non-inverting input connectd to a reference level, provided at the junction between two resistors R1 and R2 connected in series between the 12 volt supply rail and the ground rail. In the example shown, the resistors R1 and R2 have values in the ratio of 1:2 so that the reference level is 8 volts. A connection is made from the signal line SIG to the inverting input of comparator COMP, resistors R3 and R4 being connected in series between signal line SIG and ground and having their junction connected to the comparator input. The output of the comparator COMP is connected to one input of an AND gate G1 and the signal line SIG is connected to the other input of this gate. The output of gate G1 is applied to the microprocessor MP of the respective control unit.

Thus in the detecting circuit of FIG. 3, in the presence of a normal (12 volt) pulse on the signal line SIG, the output from the comparator COMP is low and the output of AND gate G1 is also low. If the signal line SIG is at 0 volts (i.e. between pulses), the comparator output is high but the output from AND gate G1 is still low because its other input is also low. However, in the presence of a pulse on line SIG which is reduced in level to below the level of the reference input to the comparator COMP, then the output from the comparator is high and the reduced-level pulse enables the other input to gate G1, so that the latter gate provides a high output to the microprocessor. In the example shown in the drawings, each pulse on signal line SIG is either at 12 volts or at 6 volts, and the 8 volt reference level applied to the comparator COMP enables the two levels for the pulses to be distinguished. In particular the detector circuit provides an output pulse for each 6 volt pulse on signal line SIG.

Figure 4:
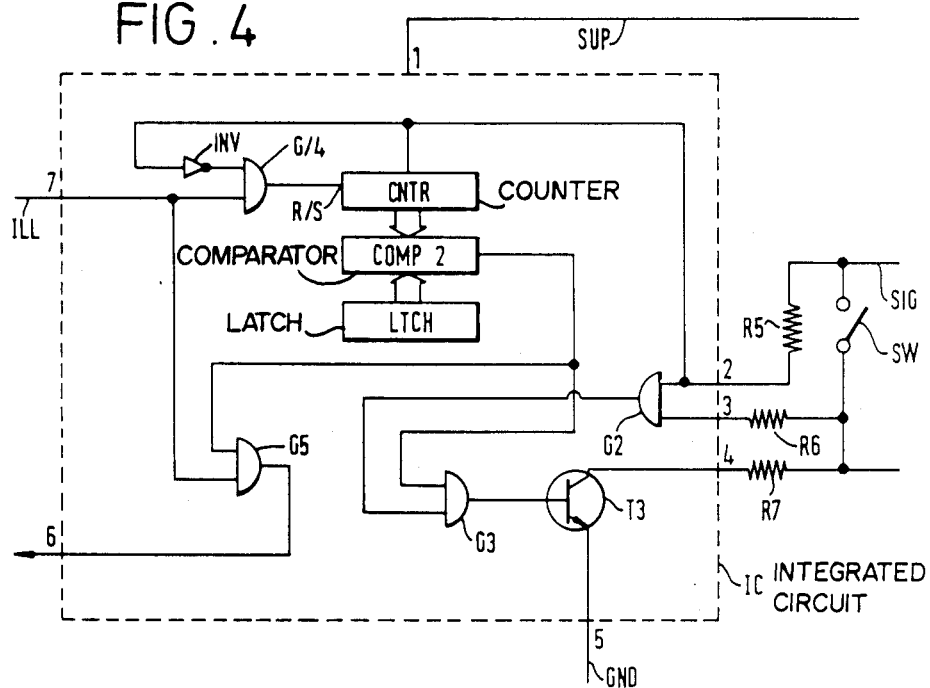
FIG. 4 is a circuit diagram of a control switch of the system.

Referring to FIG. 4, each control switch includes a preprogrammed integrated circuit IC. This integrated circuit has a pin 1 connected to the supply line SUP, a pin 2 connected to the signal line SIG via a resistor R5, a pin 3 connected to the signal line SIG via a resistor R6 and the manual switch SW in series, a pin 4 connected to a resistor R7 in parallel with resistor R6, a pin 5 connected to the ground line GND, a pin 6 connected to the local indicator light and a pin 7 connected to the illumination line ILL. Resistors R5 and R6 are relatively high and resistor R7 is matched to the output impedance of the signal line driver of each control unit CON1 and CON2. Within the integrated circuit IC, pins 2 and 3 form the inputs of an AND gate G2 and pin 2 also forms the input of a 8-bit counter CNTR. A 8-bit latch LTCH is preprogrammed with a count unique to the particular switch and a 8-bit comparator COMP 2 serves to compare the count in the counter CNTR with that preprogrammed in the latch LTCH. The output of the comparator COMP 2 is connected to one input of an AND gate G3, which receives its other input from gate G2 and has its output connected to the base of a transistor T3. The collector-emitter path of transistor T3 is connected between pin 4 and the ground pin 5 of the integrated circuit IC. This circuit comprises two further AND gates G4 and G5. Gate G4 has one input connected to the illumination line ILL (pin 7), receives another input from pin 2 via an inverter INV and has its output connected to the reset input R/S of the counter CNTR. Gate G5 has one input connected to the illumination line pin 7, receives its other input from the output of comparator COMP 2 and has its output connected to pin 6.

The counter CNTR of each switch circuit thus counts the pulses in each train being transmitted along the signal line SIG. The count within the counter CNTR is compared with the count (e.g. j) preprogrammed in the latch LTCH and, upon equality, a high output is supplied by the comparator COMP 2 to the AND gate G3. This has no effect unless the manual switch SW is closed, in which case AND gate G2 receives a high level at both its inputs in response to the pulse on the signal line SIG, supplying a high output to the second input of AND gate G3. Therefore under these circumstances, namely if switch SW is closed and upon receipt of the jth pulse in a train being transmitted aong the signal line SIG, a high output is supplied from AND gate G3 and renders transistor T3 conductive. This has the effect of strapping the signal line SIG down to ground GND through the closed switch SW, the resistor R7 and the transistor 73. As a result, the pulse passing along the signal line SIG (being the jth pulse in a train) is reduced in level, and in the example shown it is halved in level (to 6 volts) because resistor R7 is matched to the output impedance of the signal line driver of each control unit CON1 and CON2. At the next pulse in the train being transmitted along the signal line SIG, there is no longer equality between the contents of the counter CNTR and the latch LTCH so that the comparator COMP 2 no longer provides a signal for enabling AND gate G3, and transistor T3 is no longer conductive. Thus transmitted pulses before and after the predetermined or programmed count are not modified by that particular switch circuit.

After the last pulse in a train has been transmitted (i.e. after the 64th pulse of the train), a pulse is transmitted from the same control unit over the illumination line ILL, but non-coincidentally with any pulse on the signal line SIG. This condition causes AND gate G4 to provide a high which is applied to the reset input R/S of the counter CNTR of each and every switch circuit, resetting all these counters to zero in readiness for the next train of 64 signal pulses to be transmitted.

It will be appreciated that the detecting circuit of each control unit detects if a signal pulse is reduced in level and then determines which switch has been operated to cause this, according to the number of the pulse (in the 64 pulse train) which has been so-reduced. The control unit then appropriately controls the corresponding load device over the relevant wiring harness WH1 or WH2 (or both). Also, having received and responded to the command given by operation of the switch, the control unit is able, in the example shown, to return confirmation to the relevant switch and cause illumination of the indicator light local to that switch. In the example shown, this is achieved by the control unit transmitting a pulse along the illumination line ILL in coincidence with the jth signal pulse of the next train which it transmits. Under these conditions, the pulse on the illumination line ILL is applied to the AND gate G5 of the relevant switch circuit in coincidence with a signal being provided to the other input of this AND gate from the comparator COMP 2. AND gate G5 thus provides a high output to output pin 6 of the integrated circuit IC and this service to energise the local indicator light.

Figure 5:
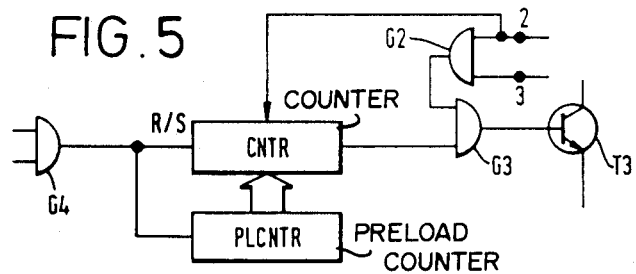
FIG. 5 is a diagram of a modified counter arrangement for the control switch circuit.

FIG. 5 shows a modified counter arrangement for each switch circuit. In this, the comparator COMP 2 and latch LTCH of FIG. 4 are replaced by a preload counter PLCNTR having its reset input connected to the output of AND gate G4. The overflow terminal O/F of the counter CNTR provides one input to AND gate G3, the other input to this AND gate being provided from the AND gate G3 as in FIG. 4. When gate G4 supplies a resetting pulse, the preload contents of preload counter PLCNTR are duplicated into the counter CNTR. At the predetermined signal pulse in each train on signal line SIG, the counter CNTR will overflow, providing a high to gate G3 in similar manner to the effect of comparator COMP 2 in FIG. 4.

Figure 6:
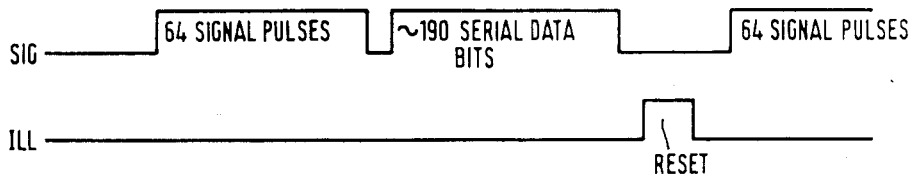
FIG. 6 is a waveform diagram for signal and illumination wires of the bus in a multiplex control system extended to carry data for the instruments of the vehicle facia.

The control system which has been described may furthermore control the instruments mounted to the vehicle facia. The instruments may all be driven by an instrumentations package mounted behind the facia and connected to the bus B. Typically the instrumentations package may require approximately 190 serial data bits to drive its various instruments. Referring to FIG. 6, in accordance with this invention one or other control unit CON1 or CON2 may transmit these data bits over the signal line SIG between successive trains of the 64 signal pulses. As shown, the resetting pulse for the counters CNTR may be transmitted after the block of instrumentation data bits and before the next train of signal pulses. The format shown involves approximately 256 bits for each sequence and a pulse repetition frequency of 5 kHz could be used conveniently, being well below frequencies occuring in other electrical systems of a vehicle and enabling pronounced capacitive filtering of the pulses.

The multiplex control system has been described in relation to the facia or dashboard of a vehicle but may also be used in other applications. For example, it may be used in vehicle doors where the same switch circuits can be employed for monitoring switch operations and the control unit(s) can be used for operating local loads such as window lift relays.

Figure 7:
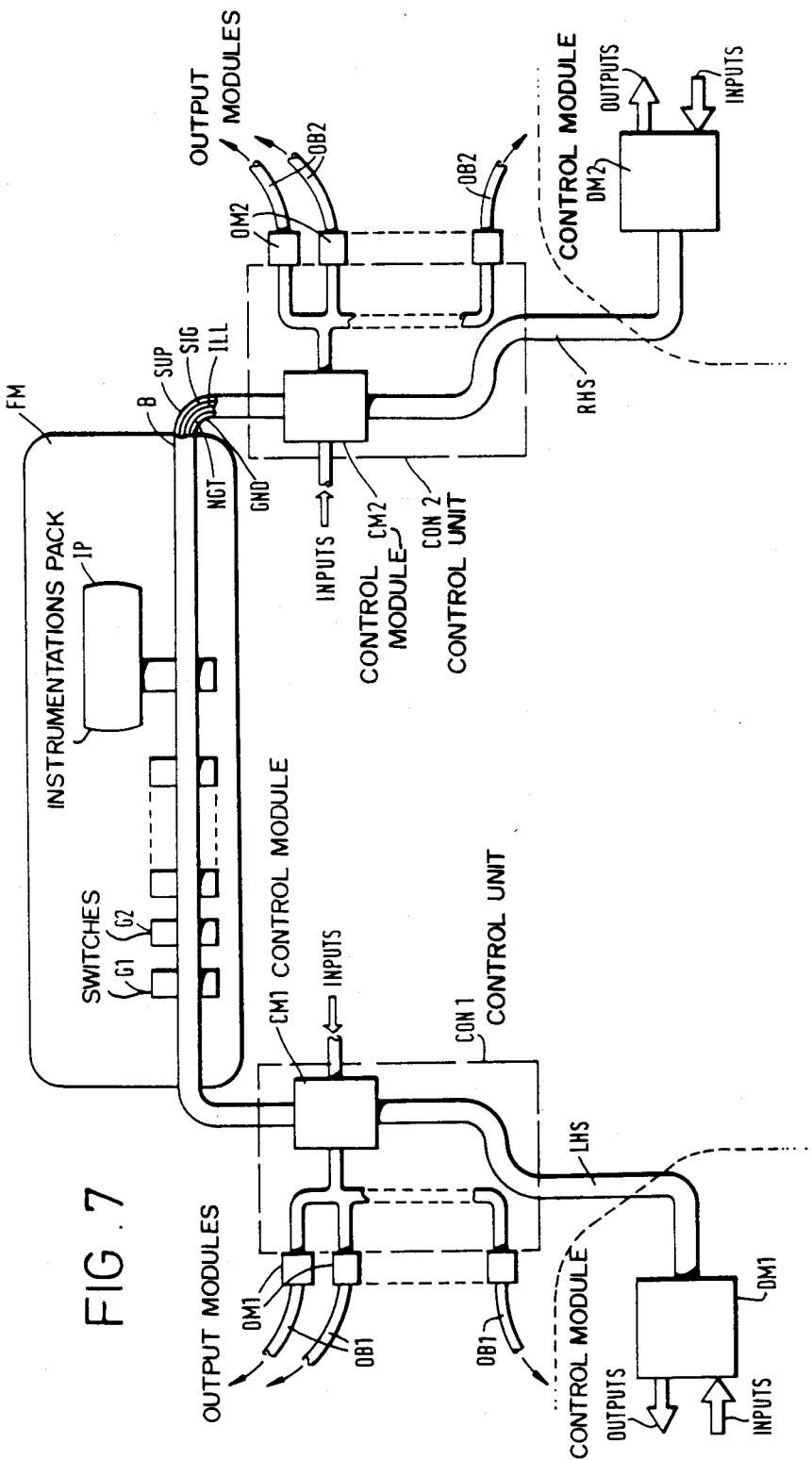
FIG. 7 is a diagram of another multiple control system in accordance with this invention.

FIG. 7 shows a multiplex control system incorporating developments over the control system so far described. The control system shown in FIG. 7 comprises the bus B attached to the reverse of the facia moulding FM of the vehicle and extending between two control units CON 1 and CON 2 as in FIG. 1. The facia includes a number of groups of switches G1, G2 . . . and an instrumentations pack IP. The arrangement and function of the system of FIG. 7 so far described corresponds to the arrangement and function of the system of FIGS. 1 to 6. Howevr, instead of having one integrated circuit per switch, the system of FIG. 7 comprises one integrated circuit for each group of switches. Thus, logical groups of switches (e.g. the switches of the steering column stalk, or the electric window switches) are interconnected with the bus B by a respective integrated circuit having the number of inputs and outputs required by all the individual switches. This saves having an excessive number of integrated circuits and renders the system more cost effective. Furthermore in FIG. 7, in addition to the supply wire SUP, ground wire GND, signal wire SIG and illumination wire ILL, the bus B includes a fifth wire NGT which carries current to provide for background illumination for the switches, for use at night. the illumination wire ILL is used for resetting the pulse counters of the switch integrated circuits and for providing indicating illumination to each "operated" switch as described previously. In addition however, it is used for switching a local load on and off, as well as the local indicator light, in response to a pulse transmitted on the illumination wire co-incident with the jth pulse on the signal line.

Each control unit CON 1 and CON 2 includes a control module CM1, CM@to which the facia bus B is connected. A similar bus LHS, RHS connects each control module to similar modules DM1 and DM2 in the left and right hand doors of the vehicle. Each bus LHS and RHS includes the same 5 wires as the facia bus B, plus a 12 volt power wire and a power ground wire. The power ground wire is required for reversible drive motors e.g. for the windows. As shown, each door module has outputs to drive the loads and inputs connected to a group of switches, e.g. in the driver door switch panel. Each control module CM1, CM2 receives inputs from sensors around the car and preferably on the same side of the vehicle.

Each control module CM1, CM2 is further connected by output busses OB1 and OB2 to output modules OM1, OM2. These output modules may comprise groups of up to eight smart FET load drivers mounted in a small plug-in together with an intelligent chip. The loads driven by each output module drives comprise a specific group, e.g. left rear lamps. Modular harnesses for each such group of loads may be plugged into the output module concerned. The smart FET'seach provide a diagnostic output signal, which is transmitted to the respective control module in the same way as the condition of a facia switch is communicated to the control module over bus B, as described above. Thus the diagnostic signal may be provided in response to current sensing an output and detecting e.g. an open circuit (e.g. a bulb failure) or an over-current. Thus the system provides a built-in facility for checking lamp bulbs or any other loads disposed around the vehicle, which loads are controlled or actuated by the smart FET's.

What is claimed is:

1. A multiplex control system comprising a wiring bus, a control unit connected to one end of the bus, and a plurality of of input elements connected to the bus in parallel, the control unit being arranged to transmit a pulse train along the bus and each input element including a circuit arranged to count the pulses and modify the jth pulse where j is a count unique to that particular input element if that input element is in a predetermined condition, and the control unit being further arranged to detect any such pulse modification and identify the corresponding input element, wherein each input element is arranged to modify the jth pulse of the pulse train, when that input element is in its predetermined condition, by shunting a wire carrying the pulse train so as to cause a reduction in amplitude of the jth pulse.

2. A multiplex control system as claimed in claim 1, in which said bus includes a reset wire for carrying a pulse to reset the counting circuit of the input elements.

3. A multiplex control system as claimed in claim 2, in which said control unit is arranged to transmit a pulse on said reset wire coincident with the jth pulse in said train in order to control a local load of the corresponding input element.

4. A multiplex control system as claimed in claim 1, in which the control unit is arranged to transmit data in serial form over the wire carrying said train of pulses, which serial data is transmitted between successive said trains of a predetermined number of pulses.

5. A multiplex control system comprising a wiring bus, a first control unit connected to one end of the bus, and a plurality of input elements connected to the bus in parallel, the first control unit being arranged to transmit a pulse train along the bus and each input element including a circuit arranged to count the pulses and modify the jth pulse where j is a count unique to that particular input element if that input element is in a predetermined condition, and the first control unit being further arranged to detect any such pulse modification and identify the corresponding input element, fruther comprising a second control unit with said bus extending between said first and second control units, said first and second control units being arranged to transmit said trains of pulses alternately.

6. A multiplex control system as claimed in claim 5, in which each input element is arranged to modify the jth pulse of the pulse train, when that input element is in its predetermined condition, by shunting a wire carrying the pulse train so as to cause a reduction in amplitude of the jth pulse.

7. A multiplex control system as claimed in claim 5, in which said bus is arranged for mounting across the facia of a vehicle with the two control units on opposite sides of the vehicle and controlling load devices on the respective sides of the vehicle, said input elements comprising control switches for said load devices.

8. A multiplex control system as claimed in claim 7, further comprising at least one instrument for the facia connected to said bus to receive data in serial form along said bus from a said control unit.

9. A multiplex control system as claimed in claim 7, further comprising additional said busses connected to said control units and having additional said input elements connected to them.

10. A multiplex control system as claimed in claim 5, in which said bus includes a reset wire for carrying a pulse to reset the counting circuit of the input elements.

11. A multiplex control system as claimed in claim 10, in which said control unit is arranged to transmit a pulse on said reset wire coincident with the jth pulse in said train in order to control a local load of the corresponding input element.

12. A multiplex control system as claimed in claim 5, in which the control unit is arranged to transmit data in serial form over the wire carrying said train of pulses, which serial data is transmitted between successive said trains of a predetermined number of pulses.

* * * * *